W. R. BAGNALL.
Vulcanizing Apparatus.
No. 38,369. Patented May 5, 1863.
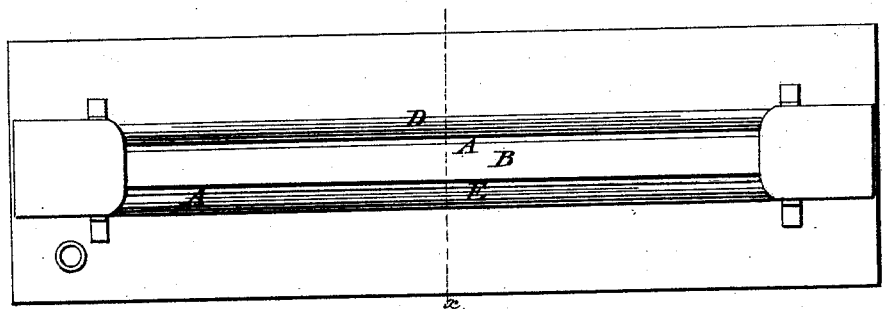
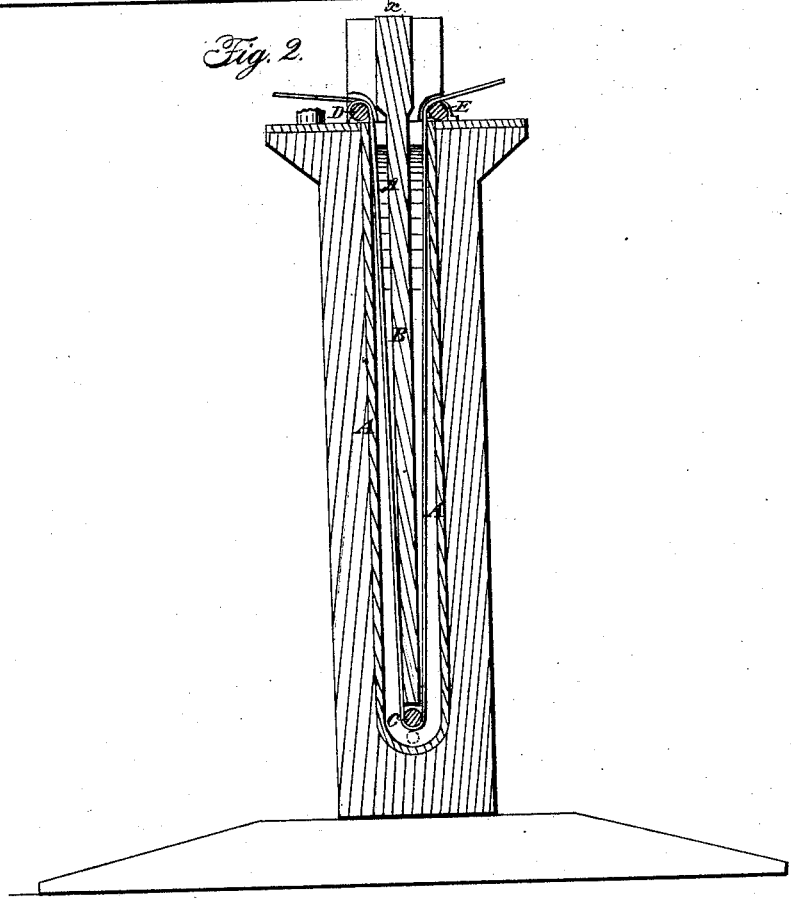
Witnesses:
Inventor:

UNITED STATES PATENT OFFICE.

WILLIAM R. BAGNALL, OF CHELSEA, MASSACHUSETTS.

IMPROVED APPARATUS FOR CURING CAOUTCHOUC.

Specification forming part of Letters Patent No. 38,369, dated May 5, 1863.

*To all whom it may concern:*

Be it known that I, WILLIAM R. BAGNALL, of Chelsea, county of Suffolk, and State of Massachusetts, have invented an Apparatus for Curing Caoutchouc; and I do hereby declare that the following, taken in connection with the drawings which accompany and form part of this specification, is a description of my invention sufficient to enable those skilled in the art to practice it.

This invention consists in a peculiarly constructed and arranged apparatus for bringing caoutchouc in contact with a fluid mixture employed in curing it, and for facilitating the management of the rubber and economizing the consumption of the curing-fluid.

The accompanying drawings represent the apparatus embodying my invention Figure 1 being a plan of the same; and Fig. 2, a vertical cross-section taken in the line $x\,x$, Fig. 1.

A denotes a vat for containing the curing-fluid. It is made of any suitable substance not materially acted on by the fluid, (lead being preferred,) and is very deep compared with its width, this being sufficient only to allow a sheet of caoutchouc to enter and descend the vat on one side into the fluid contained therein and to turn and pass up and freely out of the vat on the other side thereof, the vat being divided by a partition, B, which extends nearly to the bottom, over the lower edge of which partition the rubber turns as it ascends to leave the vat. The width of the vat is made sufficient only to admit the partition and the ingoing and outcoming parts of the rubber with a very little room for play or vibration of the rubber, for the purpose of reducing to the minimum the evaporative area of the curing fluid, which is very volatile, sufficient contact between the caoutchouc and the fluid being secured by the depth of the vat, which may be greater or less in proportion to the length of rubber which it may be desirable to have immersed at once. The partition is provided at its lower edge with a rod of glass, C', or other suitable material, which rod may be confined so as to be stationary, or may be arranged to revolve, which is found more convenient and effective. The upper edges of the vat are also provided with similar stationary or revolving rods or rolls, D E. The partition is made movable, so that it can be withdrawn to have straps or a web placed under it, by which the beginning of a new sheet of rubber can be brought under and around the lower edge of the partition when in its normal position. The partition also serves to keep apart the incoming and outgoing parts of a sheet of rubber, as without this they would vibrate into contact with each other, and, being viscid, they would adhere together.

The vat is provided with a pipe for introducing the curing-fluid, and with an outlet by which it can be drawn off. As the vat necessarily contains but very little fluid, this must be constantly furnished to the supply-pipe from a reservoir (not shown) in quantities equal to the consumption. The uncured rubber is wound upon a reel (not shown,) which may be attached on either side of the vat, or properly located with respect thereto, and the rubber is drawn off from this roll or reel by and upon a large slatted wheel or endless revolving slatted apron, the size and rotations of which are such as to permit the rubber to become sufficiently dry to be removed; but as these parts of themselves form no portion of my present invention, they are not herein shown or described.

The red line in Fig. 2 denotes the position of the rubber in its passage through the vat.

In curing the rubber in vats made in the usual manner, and where a large surface of the curing-liquid is exposed to evaporation, great loss of the liquid takes place in consequence of its high volatility, and the purpose of my construction of the vat is to save such loss by so disposing of the liquid that while I have a ready means of passing the rubber through the vat the level or top surface of the curing-liquid shall be comparatively small in proportion to the amount of liquid used, this purpose being effected by making the top part of the vat very narrow, as described, and by further displacing or diminishing the top surface of the curing-liquid by introducing the partition B as set forth, the partition also serving to prevent contact and adhesion of the incoming and outgoing portions of rubber; and I obtain the requisite amount of acting surface of the liquid by giving to the vat such depth as will correspond to the active surface otherwise obtained in passing the rubber horizontally or nearly so through wide-mouth vats, where the amount of surface of the liquid exposed to evaporation is as great or nearly as great as the extent of surface of the rubber immersed.

I claim—

1. Constructing the curing-vat with a narrow area at the level of the contained fluid, and with a movable partition operating substantially as specified.

2. Combining a vitreous or other suitable rod or roll with the movable partition, and also combining such rods or rolls with the vat at its upper edges, substantially as shown.

Executed by me this 1st day of April, A. D. 1863.

WILLIAM R. BAGNALL.

In presence of—
J. B. CROSBY,
FRANCIS GOULD.